United States Patent

Weil

3,900,665

Aug. 19, 1975

[54] FLAME RETARDING OF SOLID SUBSTRATES WITH HYDROXYALKYLPHOSPHONATE CARBAMATES

[75] Inventor: Edward D. Weil, Hastings-on-Hudson, N.Y.

[73] Assignee: Stauffer Chemical Company, Westport, Conn.

[22] Filed: Aug. 20, 1973

[21] Appl. No.: 389,606

Related U.S. Application Data

[62] Division of Ser. No. 157,699, June 28, 1971, Pat. No. 3,835,204.

[52] U.S. Cl. ............ 428/276; 8/116 P; 106/15 FP; 106/177; 427/342; 427/392; 252/8.1; 260/938; 260/971
[51] Int. Cl. ............................................. C09d 1/00
[58] Field of Search ......... 8/116 P; 106/15 FP, 177; 117/136, 143 R; 252/8.1; 260/938, 971

[56] References Cited
UNITED STATES PATENTS

3,763,283  10/1973  Curgan .............................. 260/938
3,825,630  7/1974  Sello et al. ........................ 260/938

FOREIGN PATENTS OR APPLICATIONS

1,817,682  12/1968  Germany ............................ 260/938

*Primary Examiner*—Michael R. Lusignan

[57] ABSTRACT

The present invention provides a process for flame retarding textiles, paper and other flammable, solid substrates by applying to the substrate at least one novel hydroxyalkylphosphonate carbamate corresponding to the formula:

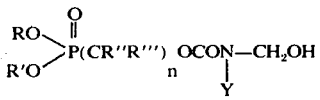

where $n$ is an integer having a value of from 1 to about 4, R and R' can be the same or different and are selected from the group consisting of $C_1$—$C_4$ alkyl, allyl and halohalkyl groups, Y is H or $CH_2OH$ and R'' and R''' can be the same or different and are selected from the group consisting of H and $C_1$—$C_4$ alkyl groups, whereupon the thus applied carbamate is cured so as to form an insoluble, fire retardant finish.

16 Claims, No Drawings

FLAME RETARDING OF SOLID SUBSTRATES WITH HYDROXYALKYLPHOSPHONATE CARBAMATES

This is a division of application Ser. No. 157,699 filed June 28, 1971, now U.S. Pat. No. 3,835,204, patented Sept. 10, 1974.

TECHNICAL DISCLOSURE OF THE INVENTION

This invention comprises the novel hydroxyalkylphosphonate carbamates corresponding to the formula:

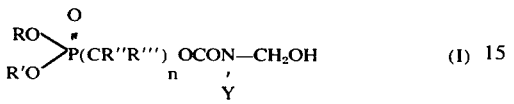

where $n$ is an integer having a value of from 1 to about 4, R and R' can be the same or different and are selected from the group consisting of $C_1$—$C_4$ alkyl, allyl and $C_2$—$C_4$ mono- and dihaloalkyl groups, Y is H or $CH_2OH$ and R'' and R''' can be the same or different and are selected from the group consisting of H and $C_1$—$C_4$ alkyl groups. Applicable halo groups for R and R' include chloro and bromo groups which must, moreover be substituted upon a carbon atom which has at least one intervening carbon atom between it and the oxygen linkage.

The invention also comprises a process for flame retarding textiles, especially callulosic textiles, and other flammable, solid substrates, by applying thereto an effective amount of at least one of the above described hydroxyalkylphosphonate carbamates and thereafter effecting its curing, i.e. its polymerization, by the application of heat, usually in the presence of an acidic catalyst, so as to form an insoluble, fire retardant finish resistant to laundering.

The preparation of these novel hydroxyalkylphosphonate carbamate compounds may be accomplished by means of a variety of procedures. Thus, where n in the above given formula (I) has a value of 1, they may be conveniently prepared by reacting carbamoyl chloride, i.e.

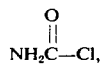

or isocyanic acid, i.e. HNCO, with an equimolar amount of a dialkyl hydroxyalkylphosphonate of the formula:

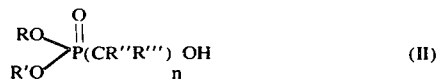

wherein R, R', R'' and R''' and n are as defined hereinabove. This reaction may be conducted without a solvent or in any solvent which is non-reactive towards the starting reagents as well as towards the resulting carbamate. Suitable solvents include ethers such as the dimethyl ether of ethylene glycol, ketones such as acetone, hydrocarbons such as toluene, chlorinated hydrocarbons such as ethylene dichloride and esters such as ethyl acetate. The reaction is conducted while maintaining the temperature of the system at from about −20° to about 100°C, and requires a reaction period of from about 0.1 to 50 hours. The product of this reaction is a carbamate having the formula:

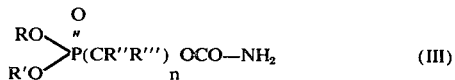

wherein R, R', R'' and R''' are as defined in (I) and where $n = 1$.

This carbamate (III) is then methylolated by reaction with about 1 or 2 moles of aqueous formaldehyde, which can be in gaseous, liquid solution or solid form, over a period of from about 0.1 to 50 hours at a temperature in the range of from about 0° to 100°C. while maintaining the pH of the system at an alkaline pH preferably in the range of from about 7.5 to 10. By means of this procedure, there will be obtained a hydroxyalkylphosphonate carbamate corresponding to (I) which usually comprises an equilibrium mixture of the mono- and dimethylol substituted derivatives; the specific proportions of the mono and dimethylol derivatives within the mixture depending upon the molar ratio of the formaldehyde relative to the carbamate (III) used in conducting the reaction A number of routes are available for preparing the precurser alcohols of structure (II). Thus, where n is 1, these intermediate compounds can be made by adding a dialkyl, diallyl, or di(haloalkyl) phosphite to a carbonyl compound R''C(=O)R''', as described for example by Overberger and Sarlo, J. Org. Chem., 26,4710. Where n is 2, the compounds (II) can be made by reaction of a 1,2-epoxide with a phosphite (RO)(R'O)PHO as described by Pudovik et al. Izv. Akad. Nauk SSR, 1952, 947. Where $n$ is 3 or 4, the intermediates of structure (II) can be made by the free radical catalyzed addition of (RO)(R'O)PHO to an unsaturated alcohol in the manner described by Hamilton et al in U.S. Pat. No. 2,957,931 or by Stiles et al. in U.S. Pat. No. 2,724,718.

Where $n$ in the above given formula (I) has a value of from 1 to about 4, the novel hydroxyalkylphosphonate carbamates of this invention can be prepared by means of a process in which the first step comprises the reaction between a trialkyl phosphite, or the alkali metal salt of a dialkyl phosphite, and a carbamate corresponding to the formula:

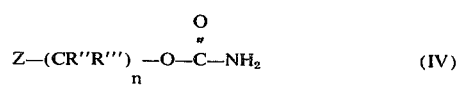

where R'', R''' and $n$ are as defined in (I) and Z is a halo group selected from the class consisting of chloro and bromo groups. Applicable di- or trialkyl phosphites for use in this reaction include dimethyl, diethyl, dipropyl, diisopropyl, dibutyl, trimethyl, triethyl, tripropyl, triisopropyl and tributyl phosphite. And, where a dialkyl phosphite is used, it is employed as its potassium or sodium salt. The above described reaction yields a carbamate intermediate corresponding to (III), but wherein n can have a value of from 1 to about 4, which is then methylolated by reaction with formaldehyde or paraformaldehyde in the manner described hereinabove in order to complete the preparation of the novel hydroxyalkylphosphonate carbamates (I) of this invention.

In addition to the above described procedures, carbamates wherein $n$ may have a value of from 1 to about 4 can be prepared by means of a procedure in which the carbamate (III), wherein $n = 1$ to about 4, is first synthesized by (a) the reaction between a hydroxyalkylphosphonic ester and phosgene so as to yield a chlorocarbonate ester which is then amidated to yield a carbamate of the structure (III). The latter intermediate is then methylolated to complete the reaction.

Exemplary of the novel hydroxyalkylphosphonate carbamates of this invention are:
diethyl hydroxymethylphosphonate dimethylolcarbamate, i.e.

diethyl hydroxymethylphosphonate methylolcarbamate, i.e.

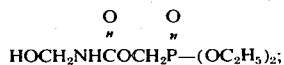

diethyl α-hydroxyethylphosphonate dimethylolcarbamate, i.e.

diethyl α-hydroxyethylphosphonate methylolcarbamate, i.e.

diethyl α-hydroxyisopropylphosphonate dimethylolcarbamate, i.e.

diethyl α-hydroxyisopropylphosphonate methylolcarbamate, i.e.

As well as the dimethyl analogs of each of the above listed compounds.

Additional representative compounds include: bis(2-chloroethyl) hydroxymethylphosphonate methylolcarbamate or dimethylolcarbamate, bis(2,3-dibromopropyl) hydroxymethylphosphonate methylolcarbamate or dimethylcarbamate and diallyl hydroxymethylphosphonate methylolcarbamate or dimethylolcarbamate.

It is to be noted, at this point, that the preferred compounds for use in preparing fire retardant finishes are those wherein n in formula (I) has a value of 1.

Within the broad class of compounds encompassed by this invention, several substances having particular utility may be distinguished: (1) the compounds wherein $n = 1$ or where R and R' are $C_1$—$C_4$ alkyl groups and where R'' and R''' are both hydrogen are particularly efficient as flame retardants for cotton or rayon; (2) the compounds where at least one of R and R' is a bromoalkyl or dibromoalkyl group are particularly effective as flame retardants for cotton-polyester or rayon-polyester blends; and, (3) the compounds where R and R' are allyl groups are of particular interest inasmuch as they can be tightly cured onto the textile by means of both acid and free radical catalysts.

In addition to their use in the flame retardant finishing applications described herein, it is to be noted that the novel hydroxyalkylphosphonate carbamates of this invention can be employed as monomers in the preparation of flame retardant thermoset homo- and copolymers which can be used in a variety of applications including, for example, as flame retardant additives for flammable polymers and also as intermediates for preparing other flame retardant additives.

While the use of aqueous solutions comprises the most economical means of application for these hydroxyalkylphosphonate carbamate flame retardants, they may also, if desired, by applied to a normally flammable substrate while dissolved in any of the organic solvents commonly used in the solvent finishing of textiles including, for example, trichloroethylene, dichloroethane, trichloroethane, perchloroethylene, methylene chloride, etc. and mixtures thereof. The solutions, either aqueous or organic solvent, containing one or more of the selected carbamates may be applied to textiles or other substrates by the use of any desired procedure. It is merely necessary to have the hydroxyalkylphosphonate carbamate evenly absorbed throughout the mass of the textile, or other substrate, and/or to apply it to at least one surface thereof by means of any convenient procedure. Thus, they may be applied by being sprayed or printed onto one or both surfaces of the substrate or, as is more frequently the case, the substrate may be passed or padded through the solution while the latter is being held in a tank or other suitable container. Such a process is commonly referred to as a "padding technique" with the solution being referred to as a "padding bath" or "padding solution." For most applications, it is desirable to have the pH of the padding bath in the range of from about 2 to 8.

The concentration of the hydroxyalkylphosphonate carbamate within the padding bath, or other applicable solution, will be dependent upon a number of factors including, in the case of textile substrates, the nature of the fibers which comprise the textile, the degree of flameproofing that is desired in the finished textile, as well as other technical and econonic considerations known and understood by those skilled in the art. However, it is generally desirable that the padding bath should contain an amount of the hydroxyalkylphosphonate carbamate such that when the wet uptake is reduced to a dry deposit upon the textile or other substrate, the treated substrate will contain from about 5 to 50% of the hydroxyalkylphosphonate carbamate, as based upon the dry weight of the substrate, thereby yielding a finish containing at least about 0.5% of phosphorus as based on the dry weight of the substrate. Again, it is to be stressed that the latter limits are merely illustrative and may be varied so as to provide a finished article having any desired degree of flame retardancy.

The thus applied hydroxyalkylphosphonate carbamate may be cured in the wet state or it may be completely or, most preferably, partially dried before curing. The mode of curing in accordance with the process of the invention involves the application of heat in the range of from about 50° to 200°C. with the use of a temperature in the range of from about 120° to 180°C. being preferred. The effect of the curing operation is to cause the hydroxyalkylphosphonate carbamate to react with the cellulose or with itself so that it forms a crosslinked, insoluble finish in and/or on the individual fibers, or other structural elements, which comprise the textile or other flammable substrate.

The curing of the hydroxyalkylphosphonate carbamate is ordinarily carried out in the presence of an effective amount of an acidic catalyst which may be admixed with the hydroxyalkylphosphonate carbamate either before or after its application to the substrate. Suitable acidic catalysts include mineral acids such as hydrochloric and phosphoric; organic acids such as oxalic, citric, succinic, maleic, glycolic, chloroacetic, trichloroacetic and toluenesulfonic acids; and, alkyl acid phosphates and the like. Also included are the salts of strong acids with relatively weak bases such, for example, as zinc chloride, magnesium chloride, ammonium chloride, ammonium phosphates and amine hydrochlorides. Some typical amine hydrochlorides include 2-amino-2-methylpropanol hydrochloride, sold under the tradename "Catalyst AC" by the Monsanto Chemical Company and the alkanolamine hydrochloride, sold as "Catalyst XRF", by the Millmaster Onyx Corporation. The use of one or more of these catalysts in a concentration of from about 0.01 to 5%, as based on the weight of the hydroxyalkylphosphonate carbamate, will be suitable for most purposes.

It is also possible and highly desirable to carry out the curing of the hydroxyalkylphosphonate carbamate finishing agents of this invention in the presence of an effective amount of an aminoplast which may be admixed with the hydroxyalkylphosphonate carbamate either before or after its application to the substrate which is undergoing treatment. The term "aminoplast" is here meant to denote a nitrogen containing resin which is capable of reacting with itself, with the hydroxyalkylphosphonate carbamate and/or with the textile or other substrate and which is prepared by the polycondensation of formaldehyde with a compound having at least two reactive amino or amido hydrogen atoms. Exemplary of the aminoplasts applicable for use in the finishing process of this invention are methylolureas which may be either straight chained or cyclic, methylolmelamines, methylolcarbamates, methylolurons, methylolamides, methyloltriazines, the methyl ethers of the above listed methylol compounds, methylolated acid amides, dimethyl hydroxymethylcarbamoylethylphosphonate, urea glyoxal condensation products, urea-glyoxal-formaldehyde condensation products, N-methylolated or N,N-dimethylolated O-alyly, O-alkoxy or O-hydroxyalkyl carbamates. Preferred aminoplasts include tris(methoxymethyl) melamine, as sold by the American Cyanamid Co. under the trademark "AEROTEX M-3"; partially methylolated methoxymethyl melamine, as sold by the American Cyanamid Co. under the trademark "AEROTEX 23 SPECIAL"; dimethylolethylene urea; dimethyloldihydroxyethylene urea, dimethylol methyl carbamate, dimethylol hydroxyethyl/hydroxypropyl carbamate and dimethoxymethyl uron.

The use of one or more of the above described aminoplasts is useful in the fire retardant finishing process of this invention where additional durable press or hand-building character is desired in the resulting finishes. For most purposes, the use of one or more of the above described aminoplasts in a concentration up to about 10 times the weight of the hydroxyalkylphosphonate carbamate will be satisfactory.

As used in this disclosure, the term "fire retardant" is intended to refer to that particular property of a material which provides it with a degree of resistance to ignition and burning. Thus, a fire or flame retardant textile, paper or other solid substrate is one which has a low level of flammability and flame spread. This property may be conveniently evaluated by means of any of the standard flame retardancy tests.

The process of this invention is compatible with a wide variety of other textile finishing operations which can be carried out prior, simultaneous with, or subsequent to the process of the invention. These other questions include, for example, application of durable press, softening, antistatic, abrasion resistance, water-repellent, soil-release, and antimicrobial finishes, as well as bleaching, dyeing, printing flocking, and texturing.

Thus, the finishing formulations of the invention may also optionally contain other types of ingredients known in the textile finishing art. For example, water and soil repellents, optical brighteners and colorants, softening agents such as polyethylene emulsions, hand-modifying agents, buffering agents, pH-controlling agents which may be acidic or basic, emulsified waxes, chlorinated paraffins, polyvinyl chloride, polyvinylidene chloride, homo- and copolymers of the alkyl acrylates and other resinous finishing agents may be added in conjunction with the finishing agents of the invention. And, where an extremely high degree of flame retardance is required, it is also possible to employ systems containing antimony oxide, a resinous binder, particularly one containing chlorine such as chlorinated paraffin or polyvinyl chloride, along with the carbamates whose use is required in the process of this invention. Moreover, in treating wood and paper substrates, the fire retardant hydroxyalkylphosphonate carbamate finishes of this invention may be applied along with and as part of an aminoplastic binder resin. And, when used for finishing paper, these hydroxyalkylphosphonate carbamates can be used in conjunction with any of the various adhesives, sizes, wet strength additives and other materials which are ordinarily employed in the paper finishing art.

All types of cellulosic textile substrates may be treated by means of the process of this invention so as to provide them with flame retardant finishes. Thus, one may treat textiles derived from natural fibers such as cotton, i.e. a natural cellulosic, wool, silk, sisal, jute, hemp and linen, wood; synthetic cellulosics such as rayon; and blends of cotton or rayon with synthetic fibers including: nylon and other polyamides; polyolefins such as polypropylene; polyesters such as polyethylene terephthalate; cellulosics such as cellulose acetate and triacetate; fiber glass; acrylics and modacrylics, i.e. fibers based on acrylonitrile copolymers; saran fibers, i.e. fibers based on vinylidene chloride copolymers;

rubber based fibers; spandex fibers, i.e. fibers based on a segmented polyurethane; vinal fibers, i.e. fibers based on vinyl alcohol copolymers; vinyon fibers, i.e. fibers based on vinyl chloride copolymers; and, metallic fibers.

As used in this disclosure, the term "textile" or "textiles" is meant to encompass woven or knitted fabrics as well as non-woven fabrics which consist of continuous or discontinuous fibers bonded so as to form a fabric by mechanical entanglement, thermal interfiber bonding or by use of adhesive or bonding substances. Such non-woven fabrics may contain a certain percentage, up to 100%, of wood pulp as well as conventional textile fibers in which case part of the bonding process is achieved by means of hydrogen bonding between the cellulosic pulp fibers. In non-woven fabrics, the finishing agents of this invention can serve not only as flame retardant finishes but can also contribute to the interfiber bonding mechanism by serving as all or part of the adhesive or bonding resin component. This dual role can also be played by the finishing agents of this invention in fabric laminates where the finishing agent can at the same time serve as the interlaminar bonding agent and as the flame retardant. In both of these systems, i.e. non-woven fabrics and laminated fabrics, the finishing agents of this invention can also be blended with the usual bonding agents such, for example, as acrylic emulsion polymers, vinyl acetate homo- and copolymer emulsions, styrenebutadiene rubber emulsions, urethane resin emulsions, polyvinyl chloride emulsions, vinyl chloride-alkyl acrylate copolymer emulsions polyacrylates modified by vinyl carboxylic acid comonomers and the like.

It should also be noted, at this point, that in addition to being used to provide flame retardant finishes for textiles, the above described hydroxyalkylphosphonate carbamates can also be employed for the flameproofing of a wide variety of cellulosic substrates such as paper, wood, plywood, chipboard, jute, batting and the like.

The intermediate carbamates of structure (III) are useful in their own right, without methylolation, since they can be bonded to a textile by means of a reaction with an aminoplast. Thus, for example, a compound of structure (III), such as is illustrated by dimethyl hydroxymethylphosphonate carbamate or bis(2,3-dibromopropyl) hydroxymethylphosphonate carbamate can be admixed with about 0.2 to 5 parts, by weight, of tri-, tetra, or pentamethylolated melamine, or a partially etherified derivative thereof, and cured in the presence of an acid catalyst such as those hereinabove described so as to yield durable flame retardant finishes on cellulosic, cellulose-polyester or other textiles. Methylolation does, however, offer the advantage of making the carbamate directly reactive with cellulose without the need for an aminoplast, and thus generally minimizes the total add-on of finish which is required in order to achieve the desired flame retarding effect.

The following examples will further illustrate the embodiment of this invention. In these examples, all parts given are by weight unless otherwise noted.

EXAMPLE I

This example illustrates the preparation of a mixture of diethyl hydroxymethylphosphonate dimethylolcarbamate and diethyl hydroxymethylphosphonate methylolcarbamate, i.e. a mixture of $(HOCH_2)_2NCOOCH_2PO(OC_2H_5)_2$ and $HOCH_2NHCOOCH_2PO(OC_2H_5)_2$, and its subsequent use as a flame retarding finishing agent for textiles.

To 81.5 gms. (1 mole) of carbamoyl chloride dissolved in 1 liter of the dimethyl ether of ethylene glycol, there is added 168 gms. (1 mole) of diethyl hydroxymethylphosphonate while the temperature of the system is maintained below 0°C., i.e. from about $-20°$ to 0°C. After 12 hours, the solvent is evaporated leaving a substantially quantitative yield of $NH_2COOCH_2PO(OC_2H_5)_2$ which is in the form of a clear syrup. Infrared analysis indicates carbonyl at 5.75 microns. Nuclear magnetic resonance shows 1.9 $NH_2$ protons, 6 $CH_2O$ and $CH_2P$ protons and 6 methyl protons (theory 2:6:6).

To 21.1 gms. (0.1 moles) of the above described intermediate product, there is then added 0.24 moles of formaldehyde as 19.5 gms. of a 37% formalin solution while the pH of the system is maintained at 9–9.6 for 1 hour at 55°C. The resulting reaction solution contains $(HOCH_2)_2NCOOCH_2PO(OC_2H_5)$ in equilibrium with $HOCH_2NHCOOCH_2PO(OC_2H_5)_2$ and HCHO (free HCHO assay). The pH of this solution is then adjusted to a level of 6.9 by the addition of HCl.

A padding bath is then prepared using 44 gms. of this solution along with 5 gms. of a partially methylolated methoxymethyl melamine, as sold by the American Cyanamid Co. under the trademark "AEROTEX 23 SPECIAL", 4 drops of octylphenoxypolyethyleneoxyethanol which serves as a wetting agent, 0.5 gms. of magnesium chloride which serves as a catalyst and sufficient water to give the bath a total weight of 50 gms. Cotton cloth having a weight of 8 oz./sq. yard is then padded through this bath so as to achieve a dry weight gain of 35% and the treated cloth is then cured for 7 minutes in an oven maintained at a temperature of 156°–162°F.

The flame retardancy of the thus finished cloth is then evaluated by means of the United States Department of Agriculture "Match Test Strip Angle Test" which is described by Beninate et al. at pages 369–370 of the April, 1969 issue of the Textile Research Journal. In brief, this test involves igniting the sample while it is being held at a measured angle to the vertical. Accordingly, it is found that the cloth treated with the hydroxyalkylphosphonate carbamate of this invention successfully passed this test as it is self-extinguishing in the 90° position and does not, on the other hand, continue to burn until completely consumed, as is the case with an untreated sample of the identical cotton cloth.

By means of the above described preparative procedure $(HOCH_2)_2NCOOCH(CH_3)PO(OC_2H_5)_2$ is prepared by substituting diethyl $\alpha$-hydroxyethylphosphonate for the diethyl hydroxymethylphosphonate. Prior to methylolation, this product is a clear syrup, %N calcd. 6.2, %N found 6.0. Similarly, $(HOCH_2)_2NCOOC(CH_3)_2PO(OC_2H_5)_2$ is prepared by substituting diethyl hydroxyisopropylphosphonate for the diethyl hydroxymethylphosphonate in the above described reaction procedure. Each of the thus produced hydroxyalkylphosphonate carbamates provides good results as a flame retarding finishing agent for textiles.

EXAMPLE II

This example illustrates the preparation of bis (2,3-dibromopropyl)hydroxymethylphosphonate dimethylolcarbamate.

To 482 gms. (1 mole) of bis(2,3-dibromopropyl) phosphite, there is added 35 gms. of 97% paraformaldehyde and the resulting mixture is warmed and agitated at 90°–100°C. until the solids have dissolved. The infrared spectrum of the liquid product reveals the absence of the PH band at 2,400 cm$^{-1}$ and the presence of a large C—OH band at 3 microns indicating that the desired bis(2,3-dibromopropyl) hydroxymethylphosphonate intermediate has formed.

To this compound, there is added a solution of 45 gms. of isocyanic acid in dimethoxyethane prepared as described by W. Stamm in British Pat. No. 1,137,292. The resulting product is allowed to stand overnight and then filtered to remove a small amount of by-product isocyanuric acid. Infrared analysis of the filtrate shows the absence of the isocyanic acid band and the presence of large C=O absorption bands at 5.75 microns and NH bands at 3.1 and 6.2 microns indicating that the desired bis(2,3-dibromopropyl) hydroxymethylphosphonate carbamate intermediate has formed. To this solution, there is added 2 moles of formaldehyde as aqueous formalin, and the pH is then adjusted to 9.1 by the addition of concentrated aqueous NaOH. After standing for 3 hours, the pH is adjusted to 4 by adding concentrated, aqueous HCl thereby obtaining a solution of bis(2,3-dibromopropyl) hydroxymethylphosphonate dimethylolcarbamate.

Variations may be made in proportions, procedures and materials without departing from the scope of this invention as defined in the following claims.

What is claimed is:

1. A process for flame retarding a flammable, cellulosic solid substrate, said process comprising applying to the substrate an effective amount of at least one hydroxyalkylphosphonate carbamate corresponding to the formula:

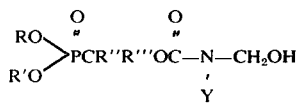

where R and R' can be the same or different and are selected from the group consisting of $C_1$—$C_4$ alkyl, allyl and $C_2$—$C_4$ mono- and dihaloalkyl groups wherein said halo substituents are chloro or bromo and are substituted upon a carbon atom which has at least one intervening carbon atom between it and the oxygen linkage, Y is H or $CH_2OH$ and R'' and R''' can be the same or different and are selected from the group consisting of H and $C_1$—$C_4$ alkyl groups and thereafter curing said carbamate so as to form an insoluble fire retardant finish on said substrate.

2. The process of claim 1, wherein said hydroxyalkylphosphonate carbamate is applied to said substrate in a concentration of from about 5 to 50% as based on the dry weight of said substrate.

3. The process of claim 1, wherein said hydroxyalkylphosphonate carbamate is selected from the group consisting of:

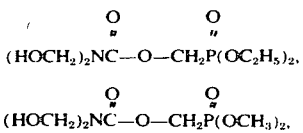

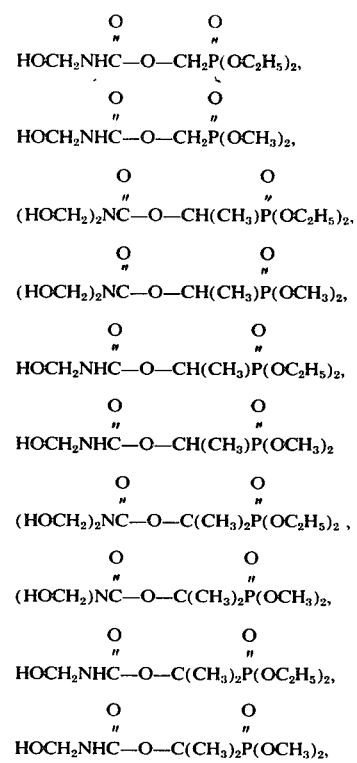

and mixtures thereof.

4. The process of claim 1, wherein the curing of said hydroxyalkylphosphonate carbamate is conducted in the presence of an effective amount of an acidic catalyst.

5. The process of claim 1, wherein the curing of said hydroxyalkylphosphonate carbamate is conducted in the presence of an effective amount of an aminoplast.

6. The process of claim 1, wherein the curing of said hydroxyalkylphosphonate carbamate is conducted in the presence of an effective amount of both an acidic catalyst and an aminoplast.

7. The process of claim 1, wherein said hydroxyalylphosphonate carbamate is applied to said substrate in an organic solvent medium.

8. The process of claim 1, wherein said hydroxyalkylphosphonate carbamate is applied to said substrate in an aqueous medium.

9. The process of claim 1, wherein said substrate is a cellulosic textile.

10. The process of claim 9, wherein said textile substrate is a cotton textile.

11. A flame retardant article, comprising a solid cellulosic substrate having present thereon a cured, fire retardant finish of at least one hydroxyalkylphosphonate carbamate corresponding to the formula:

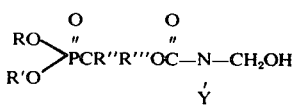

where R and R' can be the same or different and are selected from the group consisting of $C_1$—$C_4$ alkyl, allyl and $C_2$—$C_4$ mono- and dihaloalkyl groups wherein said halo substituents are chloro or bromo and are substituted upon a carbon atom which has at least one intervening carbon atom between it and the oxygen linkage, Y is H or CH₂OH and R″ and R‴ can be the same or different and are selected from the group consisting of H and C₁—C₄ alkyl groups.

12. The article of claim 11, wherein said hydroxyalkylphosphonate carbamate is selected from the group consisting of:

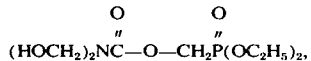

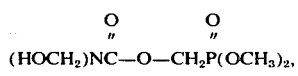

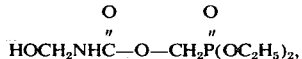

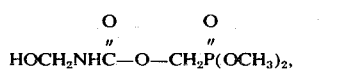

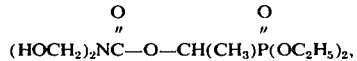

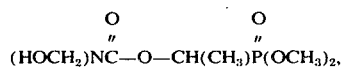

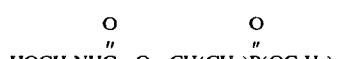

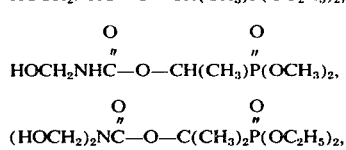

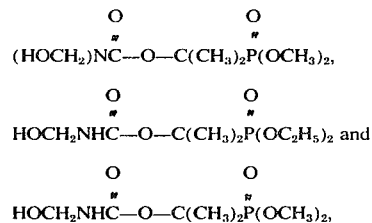

and mixtures thereof.

13. The article of claim 11, wherein said substrate is a cellulosic textile.

14. The article of claim 13, wherein said textile substrate is a cotton textile.

15. The process of claim 1, wherein said hydroxyalkylphosphonate carbamate is selected from the group consisting of: bis(2-chloroethyl)hydroxymethylphosphonate methylolcarbamate and dimethylolcarbamate; bis(2,3-dibromopropyl) hydroxymethylphosphonate methylolcarbamate and dimethylolcarbamate; and, diallyl hydroxymethylphosphonate methylolcarbamate and dimethylolcarbamate.

16. The article of claim 11, wherein said hydroxyalkylphosphonate carbamate is selected from the group consisting of:
bis(2-chloroethyl) hydroxymethylphosphonate methylolcarbamate and dimethylolcarbamate;; bis(2,3-dibromopropyl) hydroxymethylphosphonate methylolcarbamate and dimethylolcarbamate; and, diallyl hydroxymethylphosphonate methylolcarbamate and dimethylolcarbamate.

* * * * *